(12) United States Patent
Lee et al.

(10) Patent No.: US 11,652,401 B2
(45) Date of Patent: May 16, 2023

(54) SUBMODULE OF POWER CONVERTER HAVING BYPASS SWITCH

(71) Applicant: HYOSUNG HEAVY INDUSTRIES CORPORATION, Seoul (KR)

(72) Inventors: Doo Young Lee, Uiwang-si (KR); Yong Hee Park, Anyang-si (KR); Hong Ju Jung, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 17/623,388

(22) PCT Filed: Aug. 21, 2020

(86) PCT No.: PCT/KR2020/011207
§ 371 (c)(1),
(2) Date: Dec. 28, 2021

(87) PCT Pub. No.: WO2021/034152
PCT Pub. Date: Feb. 25, 2021

(65) Prior Publication Data
US 2022/0376610 A1    Nov. 24, 2022

(30) Foreign Application Priority Data

Aug. 21, 2019   (KR) .................. 10-2019-0102702

(51) Int. Cl.
*H02M 1/32*   (2007.01)
*H02M 7/483*  (2007.01)

(52) U.S. Cl.
CPC ........... *H02M 1/325* (2021.05); *H02M 1/322* (2021.05); *H02M 7/4835* (2021.05)

(58) Field of Classification Search
CPC ..... H02M 7/4835; H02M 1/322; H02M 1/325
See application file for complete search history.

(56) References Cited

U.S. PATENT DOCUMENTS

2019/0131885 A1   5/2019 Dorn et al.
2022/0085731 A1*  3/2022 Mohanaveeramani ......................
                                                H02M 7/155

FOREIGN PATENT DOCUMENTS

JP   2001-244791 A   9/2001
JP   2006-129572 A   5/2006
(Continued)

OTHER PUBLICATIONS

Wang, Lei et al. "Automation and control design of overvoltage protection for sub-modules in modulm multilevel converter", 2017 IEEE 2nd Information Technology, Networking, Electronic and Automation Control Conference (ITNEC). Dec. 17, 2017, pp. 1048-1052.

(Continued)

*Primary Examiner* — Jue Zhang
(74) *Attorney, Agent, or Firm* — Novick, Kim & Lee PLLC; Jae Youn Kim

(57) ABSTRACT

The present disclosure relates to a sub-module of a power converter, the sub-module capable of allowing failure-causing electric current to bypass the sub-module when a failure occurs in the sub-module. According to an embodiment of the present disclosure, there is proposed a sub-module of a power converter, the sub-module including an energy storage unit, at least one power semiconductor circuit connected, in parallel, to the energy storage unit and configured with a plurality of power semiconductor switches and a plurality of freewheeling diodes, an auxiliary switching element connected to the energy storage unit, turned on when a failure occurs, and thus allowing electric current from the energy storage unit to pass through, and a main switching element connected in series to an output terminal of the auxiliary switching element, arranged between two output terminals connected to one of one or more of the power semiconductor circuits, forced to undergo an induced (Continued)

failure due to application of a voltage stored in the energy storage unit through the auxiliary switching element, internally short-circuited, and thus connecting the output terminals to each other.

4 Claims, 4 Drawing Sheets

(56) References Cited

FOREIGN PATENT DOCUMENTS

| | | |
|---|---|---|
| KR | 10-1197066 B1 | 11/2012 |
| KR | 10-1389579 B1 | 4/2014 |
| WO | 2016-002319 A1 | 1/2016 |

OTHER PUBLICATIONS

Elserougi et al., "A New Protection Scheme for HVDC Converters against DC Side Faults with Current Suppressior Capability", IEEE Transactions on power delivery, Jun. 10, 2014, pp. 1569-1577, vol. 29, issue 4.

* cited by examiner

SUBMODULE OF POWER CONVERTER HAVING BYPASS SWITCH

TECHNICAL FIELD

The present disclosure relates to a sub-module of a power converter and, more particularly, to a sub-module of a power module, the sub-module capable of allowing failure-causing electric current to bypass the sub-module when a failure occurs therein.

BACKGROUND ART

Usually, in a high-voltage converter, a power semiconductor that is controllable in such a manner as to be turned on and turned off is used for conversion between an alternating current voltage and a direct current voltage.

Resistance of the power semiconductor to a voltage is limited. Therefore, a plurality of semiconductor modules, each having a power semiconductor circuit, need to be connected in series to each other in order to deal with a high voltage. For configuration of the power semiconductor circuit, various semiconductor modules can be connected to each other.

As is generally known, a publicly known modular multilevel converter includes a plurality of sub-modules in each of which the above-described power semiconductor circuit forms two output terminals. The plurality of sub-modules are connected in series to each other. The sub-module, for example, may be configured to include an energy storage unit and a power semiconductor circuit connected, in parallel, to the energy storage unit and configured with a plurality of power semiconductor switches and a plurality of freewheeling diodes.

When a failure occurs in a specific sub-module among the plurality of sub-modules, the specific sub-module in which the failure occurs is short-circuited in order to stably operate a system. For this short circuit, a bypass switch allows failure-causing electric current to bypass the sub-module in which the failure occurs. Thus, with other sub-modules that operate normally, the system can continue operating normally.

Technologies that allow electric current to bypass in a short time a sub-module in which a failure occurs when the failure occurs in the sub-module are very important from the point of view of the system, as well as the sub-module. When it takes a long time for the bypass switch to perform switching, an excessive voltage may be applied to the sub-module in which a failure occurs, and excessive electric current may flow thereto. Thus, internal components (a capacitor and a power semiconductor) may explode, thereby causing a fire. Furthermore, the excessive voltage may be applied to an entire system or the excessive electric current may flow thereto. Also, an excessive voltage higher than a rated voltage may be applied to each of the sub-module, and the excessive electric current higher than rated electric current may flow thereto. The excessive voltage and the excessive electric current may have an adverse effect on the reliability of the entire system.

Technologies that use a mechanical switch have been proposed to ensure the reliability of a bypass operation performed by the bypass switch. Korean Patent No. 10-1197066 discloses the technology that enables the mechanical switch to function as the bypass switch in a power converter.

However, the use of the mechanical switch as the mechanical switch poses a problem in that it takes a long time for the bypass switch to perform switching. Therefore, in the art to which the present disclosure pertains, there is a demand for bypass switches that can operate in a stable and fast manner.

DISCLOSURE

Technical Problem

An objective of the present disclosure, which is made to solve the above-described problem, is to provide a sub-module of a power converter, the sub-module capable of allowing failure-causing electric current to quickly bypass the sub-module when a failure occurs therein.

Another objective of the present disclosure is to provide a sub-module of a power converter, the sub-module in which, with a specific signal, a specific voltage, or specific electric current, a bypass switch is forced to undergo an induced failure and thus is internally short-circuited, resulting in two output terminals being connected to each other. Thus, in the sub-module of the power converter, the specific electric current is allowed to quickly bypass the sub-module thereof.

Technical Solution

According to an aspect of the present disclosure, there is provided a sub-module of a power converter, the sub-module including: an energy storage unit; at least one power semiconductor circuit connected, in parallel, to the energy storage unit and configured with a plurality of power semiconductor switches and a plurality of freewheeling diodes; an auxiliary switching element connected to the energy storage unit, turned on when a failure occurs, and thus allowing electric current from the energy storage unit to pass through; and a main switching element connected in series to an output terminal of the auxiliary switching element, arranged between two output terminals connected to one of one or more of the power semiconductor circuits, forced to undergo an induced failure due to application of a voltage stored in the energy storage unit through the auxiliary switching element, internally short-circuited, and thus connecting the output terminals to each other.

In the sub-module, electric current that is induced with the voltage stored in the energy storage unit and is input into each of the auxiliary switching element and the main switching element may be higher than rated electric current for each of the auxiliary switching element and the main switching element, and when the electric current higher than rated electric current flows to each of the auxiliary switching element and the main switching element, the induced failure may occur in each of the auxiliary switching element and the main switching element.

In the sub-module, the voltage, stored in the energy storage unit, which is applied to each of the auxiliary switching element and the main switching element, may be higher than a rated voltage for each of the auxiliary switching element and the main switching element, and when the voltage higher than the rated voltage is applied to the auxiliary switching element and the main switching element, the induced failure may occur in each of the auxiliary switching element and the main switching element.

In the sub-module, when the failure occurs in the sub-module, failure-causing electric current may be allowed to bypass the sub-module through the output terminals and the main switching element.

In the sub-module, the auxiliary switching element may have a cathode terminal connected to the energy storage unit and an emitter terminal connected to a cathode terminal of the main switching element.

In the sub-module, the main switching element may include a press pack IGBT (PPI) semiconductor element.

In the sub-module, the auxiliary switching element may include any one of a semiconductor switch, a power semiconductor switch, a diode, and a mechanical switch.

Advantageous Effects

According to the present disclosure, a sub-module of a power converter can achieve the following effects.

According to the present disclosure, a bypass switch is quickly short-circuited when a failure occurs in the sub-module of the power converter. Thus, the effect of shortening a bypass time can be achieved.

According to the present disclosure, the bypass switch is mounted between output terminals of the sub-module of the power converter. With a specific signal, specific electric current, or a specific voltage, the bypass switch is forced to undergo an induced failure. Due to the induced failure, a short circuit occurs between the output terminals. Thus, the effect of allowing failure-causing current to quickly bypass the sub-module can be achieved.

MODE FOR INVENTION

Figure 1:
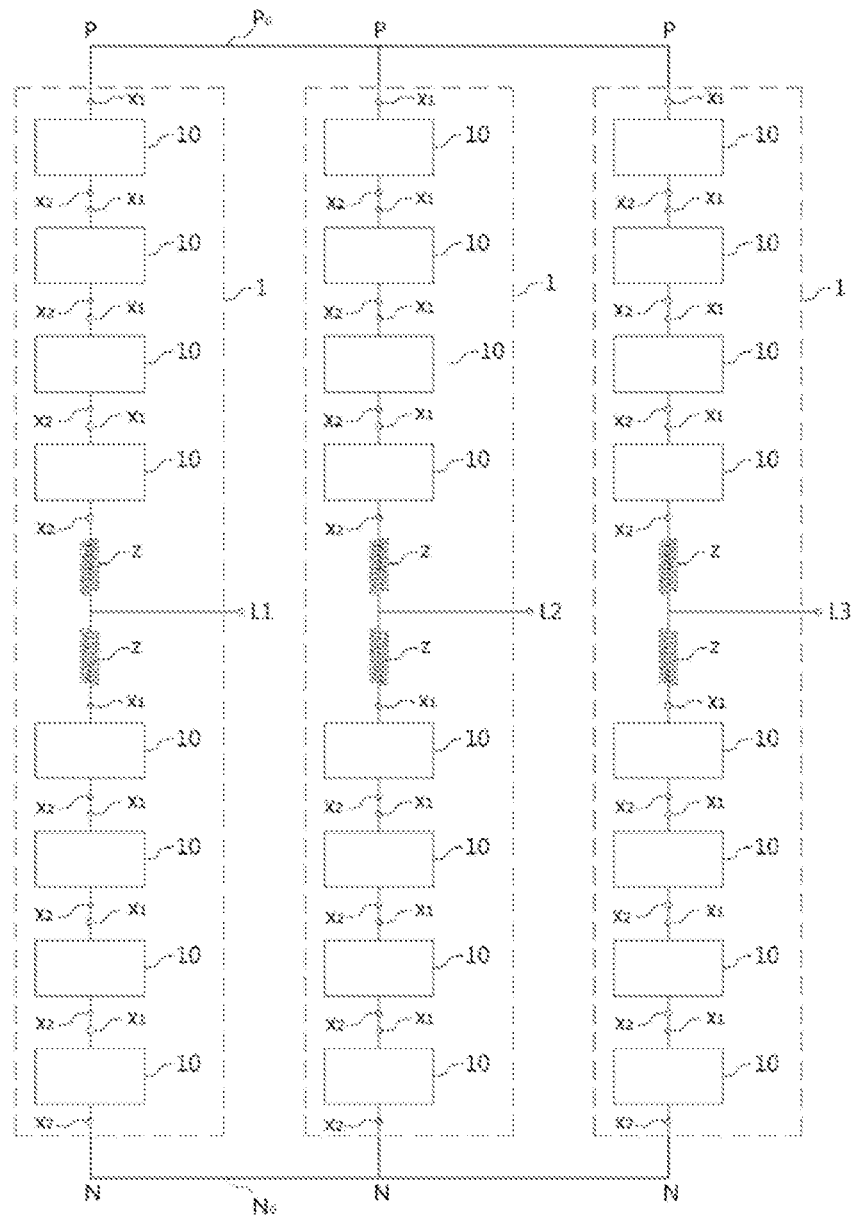
FIG. 1 is an equivalent circuit diagram illustrating a power converter according to an embodiment of the present disclosure.

Embodiments of the present disclosure will be described in detail below with reference to the illustrative drawings. It should be noted that the same constituent elements, although illustrated in different drawings, are given the same reference character, if possible, throughout the drawings. In addition, detailed specific descriptions of well-known configurations or functions related to the embodiments described below of the present disclosure will be omitted when determined as not contributing to an understanding of the embodiments of the present disclosure.

In addition, the terms first, second, and so on, A, B, and so on, and (a), (b), and so on may be used in describing constituent elements according to the embodiments of the present disclosure. These terms are used only to distinguish among the same constituent elements, and do not impose any limitation on the natures, the order, and the like of the same constituent elements. One constituent element, when described as being "coupled" to, "combined" with, or "connected" to, a different constituent element, may be directly coupled to, combined with, or connected to the different constituent, but it should also be understood that these two constituent elements may be coupled to, combined with, or connected to each other with a third constituent element in between.

FIG. 1 is an equivalent circuit diagram illustrating a power converter according to an embodiment of the present disclosure.

With reference to FIG. 1, the power converter according to the present disclosure is configured with one or more phase modules 1. A plurality of sub-modules 10 are connected in series to each other in each of the phase modules 1. In addition, direct-current voltage sides of each of the phase modules 1 are connected to positive and negative direct-current voltage main lines Po and No, respectively.

A direct current voltage, which is not indicated by its symbol, is applied between positive and negative direct-current voltage main lines Po and No. Each of the phase modules 1 has one intermediate direct-current voltage terminal and two outside direct-current voltage terminals, as load connection terminals.

The plurality of phase modules 10 are connected in series to each other in the phase module 1. Two output terminals, that is, a first output terminal X1 and a second output terminal X2 are formed on each of the sub-modules 10 that are connected in series to each other in each of the phase modules 1. Electric current is input and output through the first and second output terminals X1 and X2.

The power converter configured as described above may constitute facilities for transmitting high voltage electric current and serves to connect AC voltage power systems to each other for transmission of high electric power therebetween.

In addition, the power converter may be part of so-called FACTS facilities that serve to ensure system stabilization and desired voltage quality. Furthermore, a converter illustrated in FIG. 1 may be used when a driving technology is employed.

In the power converter according to the present disclosure, when a failure occurs in the sub-module 10, electric current that is to be input into the sub-module 10 in which the failure occurs is allowed to bypass the sub-module 10 in order to prevent an open circuit in the phase module 1 and thus protects the sub-module 10. Furthermore, the electric current bypassing the sub-module 10 flows to another sub-module 10 that operates normally, and thus normal operation of the sub-modules 10 makes it possible for the converter to operate normally.

To this end, the sub-module 10 according to the present disclosure includes a switching element, as a device for allowing failure-causing electric current to bypass the sub-module 10. With a specific signal, a specific voltage, or specific electric current, the switching element is forced to undergo an induced failure. When the induced failure occurs, the switching element is internally short-circuited within a short time, and thus a short circuit occurs between the two output terminals X1 and X2, thereby allowing electric current to bypass the sub-module 10.

At this point, the switching element that is internally short-circuited due to the induced failure is no longer restored to its normal state. Therefore, unlike a semiconductor switch in the related art, the switching element according to the present disclosure is internally short-circuited due to the induced failure. Accordingly, after internally short-circuited, the switching element is impossible to turn on and turn off and is kept short-circuited. Here the expression "being short-circuited" means being electrically short-circuited.

With a control signal of a sub-module (SM) controller, the switching element according to the present embodiment is controlled in such a manner as to be short-circuited within several msec after the failure occurs. Accordingly, during normal operation, normal phase electric current flows through a plurality of sub-modules 10, but when a failure occurs in a specific sub-module 10, through the switching element, electric current bypasses the specified sub-module 10 in which the failure occurs. Thus, the specific sub-module 10 in which the failure occurs is protected.

Figure 2:
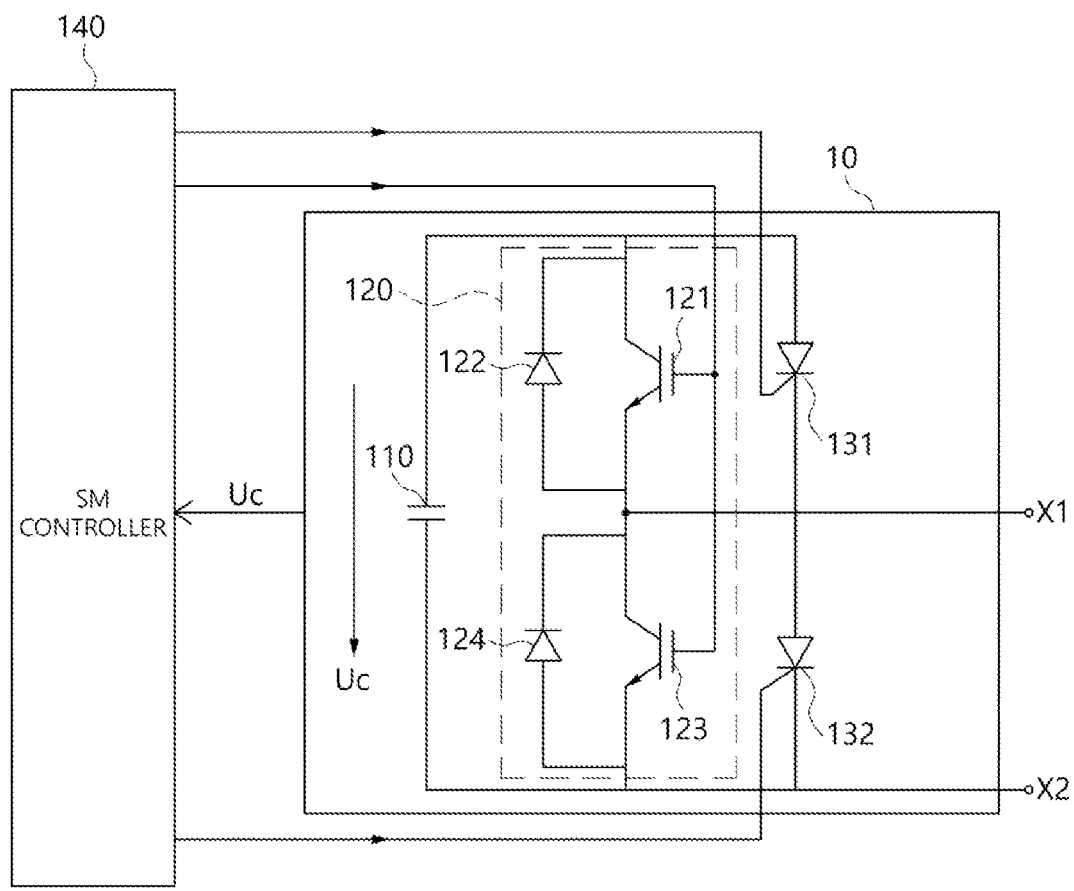
FIG. 2 is an equivalent circuit diagram illustrating a sub-module of the power converter according to the embodiment of the present disclosure.

FIG. 2 is an equivalent circuit diagram illustrating the sub-module of the power converter according to the embodiment of the present disclosure.

With reference to FIG. 2, in the power converter according to the present disclosure, each of the sub-modules 10 is configured with an energy storage unit 110 and at least one power semiconductor circuit 120 that is connected, in parallel, to the energy storage unit 110. One or more power semiconductors 120 are connected in series to each other. Each of the power semiconductor circuits 120 is configured with power semiconductor switches 121 and 123 that are controllable in such a manner as to be turned on and turned off, and freewheeling diodes 122 and 124 that are connected, in antiparallel, to the power semiconductor switches 121 and 123, respectively. In another implementation example, in each of the sub-modules 10, the energy storage unit 110 and at least one power semiconductor circuit 120 may be arranged in a different way than in FIG. 2. Thus, each of the sub-modules 10 may have various configurations.

In addition, the sub-modules 10 according to the present disclosure includes an auxiliary switching element 131 and a main switching element 132. The auxiliary switching element 131 is connected to the energy storage unit 110. When turned on, the auxiliary switching element 131 allows electric current, which is induced with a voltage applied to the energy storage unit 110, to pass through. The main switching element 132 is connected, in parallel, to one of one or more power semiconductor circuits 120.

The main switching element 132 is connected, in parallel, to one of the power semiconductor circuits 120. When electric current higher than rated electric current flows to the main switching element 132, the induced failure occurs within the main switching element 132. The main switching element 132 is short-circuited due to the induced failure. For example, the main switching element 132 may include a press pack IGBT (PPI) semiconductor element.

In this manner, according to the present disclosure, the main switching element 132 is used to allow the failure-causing electric current to quickly bypass the sub-modules 10 when a failure occurs in the sub-modules 10, thereby protecting the sub-module. Specifically, when the electric current higher than the rated electric current flows to the main switching element 132 of the sub-modules 10, a permanently induced failure occurs in the main switching element 132. Thus, the main switching element 132 is internally short-circuited. In addition, when the electric current higher than the rated electric current flows to the main switching element 132, the induced failure also occurs, and thus the main switching element 132 is internally short-circuited.

When a failure occurs in a specific sub-modules 10, the electric current higher than the rated electric current may be allowed to flow to the main switching element 132 of the sub-modules 10 or a voltage higher than a rated voltage may be applied thereto. Accordingly, the induced failure may be caused to occur in the main switching element 132, and thus, the failure-causing electric current may be allowed to quickly bypass the specific sub-module 10. Accordingly, the failure-causing electric current is allowed to more quickly bypass the specific sub-module 12 in which a failure occurs than when the mechanical switch is used.

At this point, the main switching element 132 that is internally short-circuited due to the induced failure is no longer restored to its normal state. Therefore, unlike the semiconductor switch in the related art, the switching element or a bypass switching unit according to the present disclosure is internally short-circuited due to the induced failure. Accordingly, after internally short-circuited, the switching element or the bypass switching unit is impossible to turn on and turn off and is kept shorted circuit.

A cathode terminal of the main switching element 132 is connected to an emitter terminal of the power semiconductor switch 123 of the power semiconductor circuit 120, and an emitter terminal thereof is connected to a cathode terminal of the power semiconductor switch 123. In addition, the cathode terminal of the main switching element 132 is connected to an emitter terminals of the auxiliary switching element 131.

A gate terminal of the main switching element 132 receives a turn-on signal from a sub-module (SM) controller 140. When a failure occurs in the sub-module 10, the turn-on signal may be applied from the sub-module controller 140, and thus the main switching element 132 may be turned on.

FIG. 2 illustrates that the main switching element 132 is connected, in parallel, to a lower power semiconductor circuit of the two power semiconductor circuits 120. However, the main switching element 132 may be connected, in parallel, to an upper power semiconductor circuit thereof.

According to the present embodiment, the main switching element 132 is connected, in parallel, to the power semiconductor circuit connected between the two output terminals X1 and X2 of the sub-module 10. For example, in a case where the two output terminals X1 and X2 are connected to opposite ends, respectively, of the upper power semiconductor circuit, the two output terminals X1 and X2 may be connected, in parallel, to the upper power semiconductor circuit.

A cathode terminal of the auxiliary switching element 131 is connected to one side of the energy storage unit 110. That is, the cathode terminal of the auxiliary switching element 131 is connected to the energy storage unit 110 of the sub-modules 10. Accordingly, electric current is induced with a voltage applied to the energy storage unit 110 flows to the cathode terminal of the auxiliary switching element 131.

In addition, the emitter terminal of the auxiliary switching element 131 is connected to the cathode terminal of the main switching element 132. Accordingly, when the auxiliary switching element 131 allows electric current to pass through, the electric current flows to the cathode terminal of the main switching element 132.

The auxiliary switching element 131 may be realized as a semiconductor switch or a power semiconductor switch. In addition, the auxiliary switching element 131 may be realized as a diode or a mechanical switch.

When a failure occurs in the sub-module 10, the main switching element 132 serves to allow the failure-causing electric current to pass through the sub-module 10. In this case, the main switching element 132 has to perform a bypassing operation in a short time. Otherwise, an excessive voltage may be applied to the sub-module 10, or excessive electric current may flow thereto. Thus, internal components (a capacitor and a power semiconductor) of the sub-module 10 may explode, thereby causing a fire. Furthermore, an excessive voltage may be applied to an entire system or excessive electric current may flow thereto. Also, an excessive voltage higher than a rated voltage may be applied to each of the sub-modules 10, and excessive electric current higher than rated electric current may flow thereto. The excessive voltage and the excessive electric current may have an adverse effect on reliability. It is desirable that the bypass operation is performed within several msec after a failure occurs.

A process of allowing the fault-causing electric current to bypass the sub-module 10 configured as described above when a failure occurs therein is described with reference to FIGS. 3 and 4.

Figure 3:
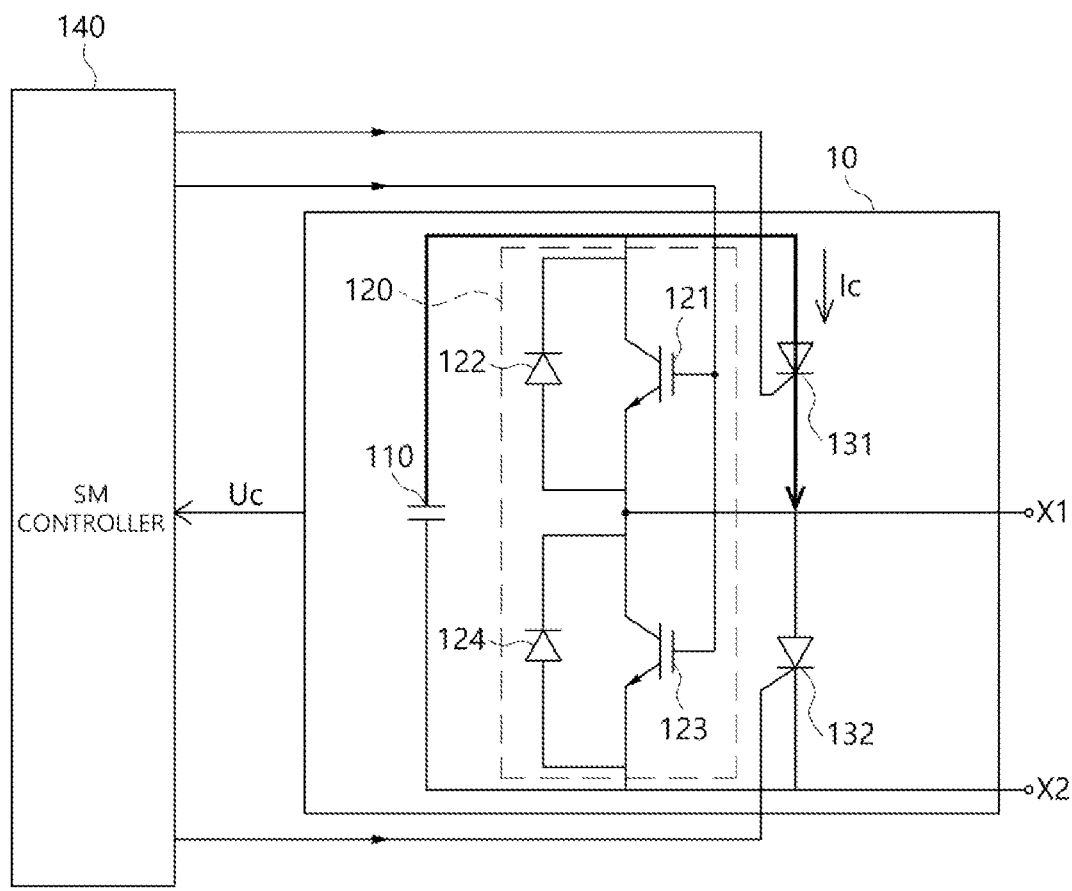
FIG. 3 is a view necessary to describe a process of turning on an auxiliary switching element when a failure occurs in the sub-module in FIG. 2.

FIG. 3 is a view necessary to describe a process of turning on the auxiliary switching element 131 when a failure occurs in the sub-module 10.

With reference to FIG. 3, when a failure occurs in a specific sub-module 10, the sub-module controller 140 turns on the auxiliary switching element 131. For example, when a failure occurs in the specific sub-module 10, the sub-module controller 140 applies the turn-on signal to the auxiliary switching element 131.

When the sub-module controller 140 applies the turn-on signal to a gate terminal of the auxiliary switching element 131, the auxiliary switching element 131 is turned on. The auxiliary switching element 131, when turned on by the turn-on signal from the sub-module controller 140, allows electric current induced with a voltage stored in an energy storage unit 110 to pass through.

The energy storage unit 110 is configured as a bipolar capacitor. When a voltage is applied, electric energy is stored in the energy storage unit 110. When the electric energy is stored, a voltage difference occurs between opposite terminals of the energy storage unit 110.

When turned on, the auxiliary switching element 131 allows electric current induced when a voltage is applied to each of the opposite terminals of the energy storage unit 110 to pass through. When the auxiliary switching element 131 allows electric current to pass through, electric current induced when the voltage is applied to each of the opposite terminals of the energy storage unit 110 passes through the auxiliary switching element 131 and flows to the main switching element 132.

The electric current flowing through the energy storage unit 110 is electric current higher than rated electric current for the main switching element 132. Therefore, when the electric current higher than the rated electric current flows from the main switching element 132 to the energy storage unit 110, due to the induced failure, the main switching element 132 is internally burned out, resulting in being short-circuited.

In addition, as described above, since the auxiliary switching element 131 allows electric current to pass through, the voltage stored in the energy storage unit 110 is applied the main switching element 132. At this point, a voltage that is applied to the main switching element 132 is higher than a rated voltage for main switching element 132. In this manner, when a voltage higher than the rated voltage is applied to the main switching element 132, the main switching element 132 is internally burned out due to the induced failure, resulting in being shirt-circuited.

As described above, when burned out one time, the main switching element 132 does so permanently and is impossible to further turn on and turn off.

As described above, the auxiliary switching element 131 may include a mechanical switch or a diode. In a case where the auxiliary switching element 131 is realized as the mechanical switch, when a failure occurs in the sub-modules 10, the SM controller 140 may turn on the mechanical switch, and thus the mechanical switch may allow electric current to pass through. In a case where the auxiliary switching element 131 is realized as the diode, electric current may be allowed to pass through without control by the SM controller 140.

Figure 4:
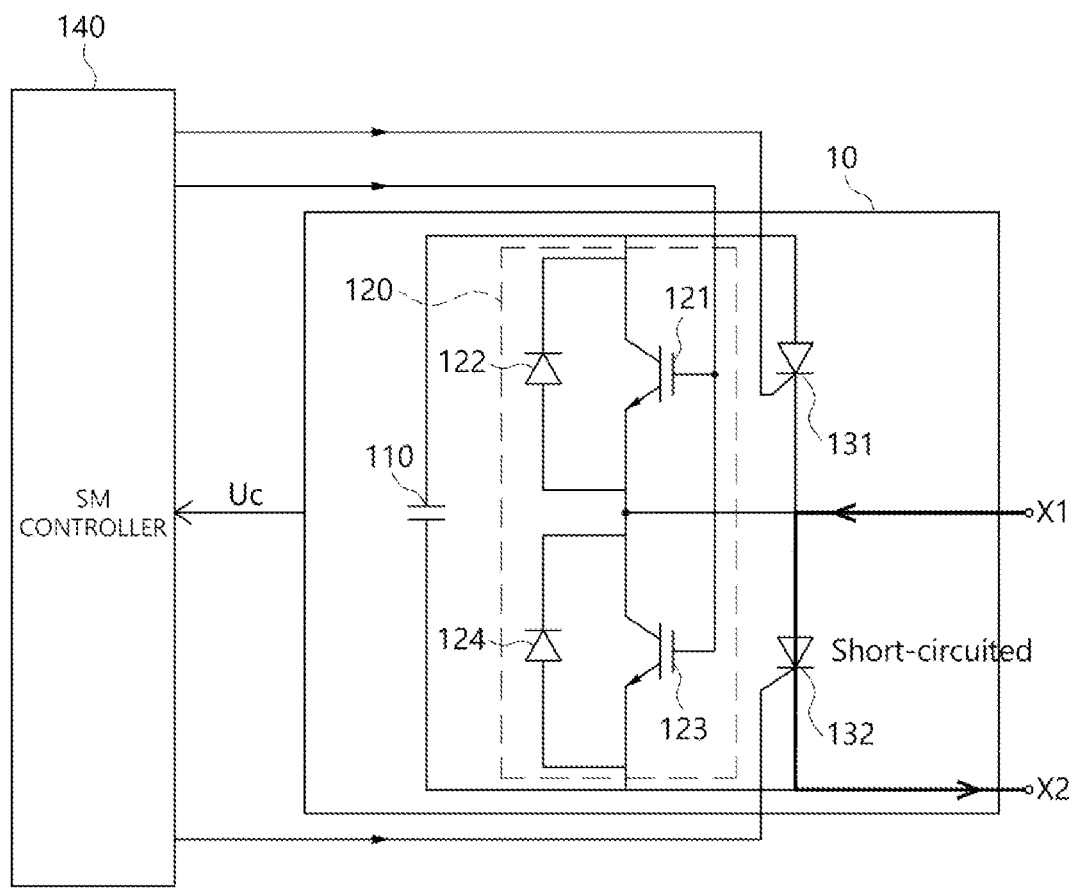
FIG. 4 is a view illustrating a bypass path that results when a main switching element is burned out.

FIG. 4 is a view illustrating a bypass path that results when the main switching element 132 is burned out due to the induced failure and thus is short-circuited.

In FIG. 4, as described above, the main switching element 132 is arranged between the two output terminals X1 and X2 that are connected to one of one or more of the power semiconductor circuits 120.

When the electric current higher than the rated electric current flows from the energy storage unit 110 to the main switching element 132 through the auxiliary switching element 131, the induced failure occurs in the main switching element 132. Thus, the main switching element 132 is burned out, resulting in being permanently short-circuited. Accordingly, the failure-causing electric current is allowed to bypass through the two output terminals X1 and X2 and the main switching element 132.

In this manner, in a case where a failure occurs, when electric current from the energy storage unit 110 flows to the main switching element 132 according to the present disclosure through the auxiliary switching element 131, the main switching element 132 may be immediately short-circuited, and thus the bypass path may be quickly formed.

In other words, when a failure occurs in a specific sub-module 10, the auxiliary switching element 131 is turned on, and thus electric current from the energy storage unit 110 connected to the auxiliary switching element 131 flows to the main switching element 132. Accordingly, the main switching element 132 may be immediately short-circuited due to the electric current from the energy storage unit 110.

That is, the main switching element 132 according to the present disclosure is forced to undergo the induced failure and thus is internally burned out, resulting in forming the bypass path. Therefore, the main switching element 132 may substitute for a mechanical switch in the related art.

The main switching element 132 according to the present disclosure is short-circuited due to electric current that flows by turning on the auxiliary switching element 131, and thus the failure-causing electric current may be allowed to bypass within one ms. Therefore, the main switching element 132 may allow the failure-causing electric current to bypass in a time shorter than a switching time of approximately four ms that it takes for the mechanical switching element in the related art to allow the failure-causing electric current to bypass the sub-module 10.

As described above, the sub-modules 10 according to the present disclosure include the auxiliary switching element 131 and the main switching element 132 that are connected, in parallel, to each other. In a case where a failure occurs in the sub-module 10, the sub-module (SM) controller 140 turns on the auxiliary switching element 131, and thus the auxiliary switching element 131 allows electric current to pass through.

At this point, the electric current higher than the rated electric current, which is induced with the voltage stored in the energy storage unit 110, flows to the main switching element 132 through the auxiliary switching element 131. Due to this electric current, the induced failure occurs in the main switching element 132, and thus the main switching element 132 is short-circuited. Accordingly, a short circuit occurs between the two output terminals X1 and X2. When the short circuit occurs between the two output terminals X1 and X2, the failure-causing electric current is allowed to bypass the sub-module 10 through the two output terminals X1 and X2 and the main switching element 132.

The induced failure may occur in the main switching element 132 due to the voltage stored in the energy storage unit 110. That is, in a case where a voltage applied from the energy storage unit 110 is higher than a rated voltage for the main switching element 132, the induced failure may occur, and thus the main switching element 132 may be short-circuited.

Accordingly, the induced failure occurs in the main switching element 132 due to the voltage stored in the energy storage unit 110, and thus the main switching element 132 is internally burned out. Accordingly, the failure-causing electric current may be allowed to bypass the sub-module 10, and the main switching element 132 may substitute for the mechanical switch in the related art.

Although all constituent elements according to the embodiment of the present disclosure are described as being combined into one constituent element or as operating in combination, the present disclosure is not necessarily limited to the embodiments. That is, all the constituent elements may be selectively combined into one or more constituent elements for operation without departing from the nature and gist of the present disclosure. The terms "include", "constitute", "have", and the like that are used above mean that the named constituent elements are not essential. Therefore, unless otherwise stated specifically, these terms should be construed to mean that additional constituent elements may be included, not that additional constituent elements are precluded. Unless otherwise stated specifically, all terms including technical and scientific ones have the same meanings as commonly understood by a person of ordinary skill in the art to which the present disclosure pertains. A commonly used term, such as a term defined in dictionaries, should be construed as having the same contextual meaning as that in the related art, and unless otherwise stated specifically in the present specification, should not be construed as having an excessively implied meaning or a purely literal meaning.

The technical idea behind the present disclosure is described above only for illustrative purpose. It is apparent to a person of ordinary skill in the art to which the present disclosure pertains that various alterations and modifications are possible without departing from the nature and gist of the present disclosure. Therefore, the embodiments of the present disclosure are for describing the technical idea of the present disclosure, rather than limiting it, and do not impose any limitation on the scope of the technical idea of the present disclosure. Accordingly, the scope of protection of the present disclosure should be defined by the following claims. All technical ideas that fall within the scope equivalent thereto should be interpreted to be included within the claims of the present disclosure.

The invention claimed is:

1. A sub-module of a power converter, the sub-module comprising:
   an energy storage unit;
   at least one power semiconductor circuit connected, in parallel, to the energy storage unit and configured to include a plurality of power semiconductor switches and a plurality of freewheeling diodes;
   an auxiliary switching element connected to the energy storage unit, turned on when a failure occurs, allowing an electric current from the energy storage unit to pass through the axillary switching element; and
   a main switching element connected in series to an output terminal of the auxiliary switching element, arranged between two output terminals X1 and X2 connected to the at least one power semiconductor circuit, forced to undergo an induced failure due to application of a voltage stored in the energy storage unit through the auxiliary switching element, internally short-circuited, and connecting the output terminals X1 and X2 to each other,
   wherein when electric current or voltage that is higher than rated electric current or rated voltage for each of the auxiliary switching element and the main switching element is applied, by the voltage stored in the energy storage unit, to the main switching element, the main switching element is forced to undergo an internally induced failure and is internally burned out, resulting in being permanently short-circuited,
   wherein once the main switching element is internally and permanently short-circuited due to the induced failure, the main switching element is no longer restored to its normal state, and after internally short-circuited, the main switch element is impossible to turn on and turn off and kept short-circuited, and
   wherein the main switching element comprises a press pack IGBT (PPI).

2. The sub-module of claim 1, wherein when the failure occurs in the sub-module, a failure-causing electric current is allowed to bypass the sub-module through the output terminals X1 and X2 and the main switching element.

3. The sub-module of claim 1, wherein the auxiliary switching element has a cathode terminal connected to the energy storage unit and an emitter terminal connected to a cathode terminal of the main switching element.

4. The sub-module as claimed in claim 1, wherein the auxiliary switching element includes at least one of a semiconductor switch, a power semiconductor switch, a diode, and a mechanical switch.

* * * * *